UNITED STATES PATENT OFFICE.

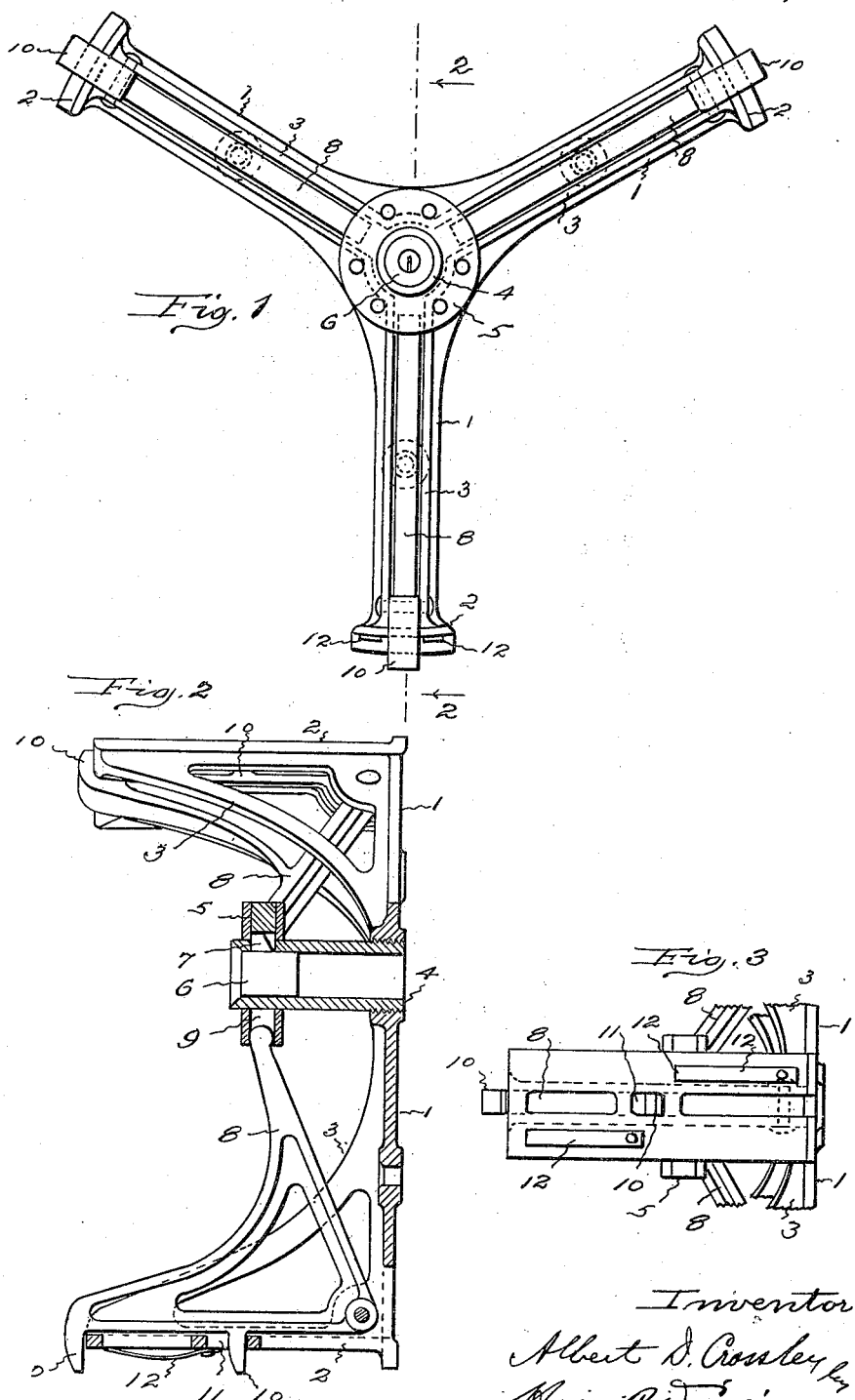

ALBERT D. CROSSLEY, OF HARTFORD, CONNECTICUT, ASSIGNOR OF ONE-HALF TO REUBEN T. BASSETT, OF HARTFORD, CONNECTICUT.

SPARE-TIRE CARRIER.

1,422,932.  Specification of Letters Patent.  Patented July 18, 1922.

Application filed July 1, 1920, Serial No. 393,340. Renewed May 25, 1922. Serial No. 563,679.

*To all whom it may concern:*

Be it known that I, ALBERT D. CROSSLEY, a citizen of the United States, residing at Hartford, in the county of Hartford and State of Connecticut, have invented a new and useful Improvement in Spare-Tire Carriers, of which the following is a specification.

This invention relates to a device which is designed to be fixed to an automobile for carrying demountable rims and tires.

The object of the invention is to provide a simple, cheap, light and strong carrier upon which demountable rims with tires may be conveniently placed and from which they may be readily removed when the device is unlocked, but from which when locked it is impossible to remove the rims and tires without breaking the supporting structure.

This object is obtained by providing a frame that is adapted to receive one or more rims and tires and is designed to be fastened to the automobile, with pivoted arms having fingers that when swung outward obstruct and prevent the removal of the rims from the frame, but when swung inward permit free removal of the rims, means being arranged for swinging the arms simultaneously and for locking the said means against movement when the fingers are in position to retain the rims on the frame.

In the accompanying drawings Fig. 1 shows a face view of a device which embodies the invention. Fig. 2 is a section of the same on the plane indicated by the dotted line 2—2 on Fig. 1. Fig. 3 shows a plan of the outer face of the foot at the end of one of the frame legs.

The frame shown has three outwardly extending legs 1 with a foot 2 that projects forwardly from the outer end of each leg and two bracket-like webs 3 that connect the outer end of each foot with the inner end of each leg. These parts preferably are cast integral and the outer surfaces of the feet are formed on arcs of a circle that is but little less than the inner diameter of the tire rims to be carried thereon. The feet may be long enough to carry one or two tired rims, as is desired. At the center the frame is provided with a forwardly extending tubular hub 4, and sliding on this hub is a sleeve 5. Secured in the outer end of the hub is a cylinder lock 6 of common construction, the bolt 7 of which is designed to pass through a hole in the side of the hub and into a locking notch in the sleeve.

Pivoted between the webs near the outer end of each leg is an angular arm 8. The inner end of each arm extends loosely into a socket 9 in the sleeve. The outer section of each arm, which lies inside of a foot, has fingers 10, one adapted to swing through a hole 11 in the foot and the other adapted to swing beyond the front end of the foot.

When the sleeve is unlocked and is moved inward along the hub the arms are swung on their pivots so as to withdraw the fingers 10 within the feet. This leaves the outer surfaces of the feet clear so that one or two rims with tires may be slipped upon them. When the sleeve is drawn outward to locking position the fingers are projected through the feet in front of the rims in such manner that the rims and tires cannot be drawn off from the feet. With the sleeve in this position and the fingers holding the rims with the tires, the locking bolt may be thrown out so as to lock the sleeve against movement on the hub and when the sleeve is thus locked the arms cannot be swung so as to withdraw the fingers from in front of the rims. The lock is enclosed within the hub and sleeve and cannot be broken off. The tumblers of the lock, of course, may be arranged in a common manner so that no two locks can be opened with the same key. When unlocked, however, by the insertion of the proper key, the sleeve is capable of instant movement inward so as to withdraw the fingers and release the rims and tires carried by the frame. In order to permit the rims to be slid on and off the frame easily, the feet extend out to such a distance that their outer faces are in a circle that is slightly smaller than the inner diameter of the rim, and to prevent rattling and yet allow the rims to be freely slid on and off, leaf springs 12 may be secured to the outer side of the bottom foot so as to press against the inner walls of the rims and hold them tight.

The invention claimed is:

1. A tire carrier comprising a frame having outwardly extending legs and forwardly projecting feet, arms pivoted to the legs and having fingers adapted to project beyond the outer surfaces thereof, means for swinging the arms, and a lock for securing said means when the arms are swung to such position that the fingers project beyond the feet.

2. A tire carrier comprising a frame having outwardly extending legs with forwardly projecting feet and webs connecting the feet and legs, arms pivoted between the webs, said arms having fingers adapted to project beyond the outer surfaces of the feet, means engaging the inner ends of the arms for swinging them, and a lock for fastening said means with the arms in such position that the fingers project beyond the feet.

3. A tire holder comprising a frame having outwardly extending legs with forwardly extending feet and webs connecting the feet and legs, a tubular hub projecting forwardly from the center of the frame, arms pivoted to the frame and provided with fingers adapted to project beyond the outer surfaces of the feet, a sleeve movable on the hub and adapted to engage the inner ends of the arms, and a lock within the hub adapted to fasten the sleeve against movement.

4. A tire carrier comprising a frame having outwardly extending legs and forwardly projecting feet, arms pivoted to the legs and having fingers adapted to project beyond the outer surfaces of the feet, means for swinging the arms, a lock for securing said means when the arms are swung into such position that the fingers project beyond the feet, and a leaf spring secured to the outer side of one foot so as to press against the inner wall of a rim placed thereon and hold it tight.

5. A tire holder comprising a frame having outwardly extending legs with feet extending forwardly from the ends of the legs and a tubular hub projecting forwardly from the center of the frame, arms pivoted to the frame and provided with fingers adapted to project beyond the outer surfaces of the feet, a sleeve movable on the hub and adapted to engage the inner ends of the arms, and a lock adapted to fasten the sleeve against movement along the hub.

ALBERT D. CROSSLEY.